United States Patent Office 2,772,174
Patented Nov. 27, 1956

2,772,174

CORROSION INHIBITING PAINTS AND METHOD OF PREPARATION

Werner L. Riegler, Western Springs, and James G. Atherton, Chicago, Ill., assignors to Armour and Company, Chicago, Ill., a corporation of Illinois No Drawing. Application April 8, 1954,
Serial No. 421,946

6 Claims. (Cl. 106—14)

This invention relates to an improved paint composition for metallic surfaces. In one of its aspects, this invention relates to a method for producing a corrosion inhibiting paint.

There has long been a need for a structural paint composition which will effectively resist corrosion of the metals by air and moisture. A major difficulty with structural paints presently available is that they crack and peel away from the metal surface thus exposing it to the elements. One of the principal causes for this skinning or peeling effect is that the paint was applied to a moist or damp surface. Of course, the obvious solution to this problem would be to make certain that the metal is dry when applying the paint. But, as a practical matter, this is extremely difficult, especially in areas where the atmosphere is naturally damp such as in seacoast, lake area, or river towns. And even in those areas which are not normally damp, painters must wait until the morning dew, which tends to collect on metallic surfaces, has evaporated before commencing to paint, thus shortening considerably the working day of the painter.

According to one aspect of the present invention, we have provided a paint composition which can be applied to moist or wet metal surfaces without peeling or skinning and which effectively resists corrosion of the metal by air and moisture. The active, inhibiting agent in our paint composition is an aliphatic monocarboxylic acid salt of an N-aliphatic alkylene diamine. We are aware that amines per se, generally, are known corrosion inhibitors, but amines have never been successfully used as anti-corrosives in paint compositions. Amines must be used in comparatively large quantities to manifest their anti-corrosive properties. But when used in sufficiently large quantities to be anti-corrosive, they so adversely affect the other properties of the paint, such as consistency and brushing qualities, that they cannot be used. This is not the case in the present invention. Our diamine salts are used in small quantities, generally not exceeding 2½ percent based on the total pigment. Further, besides being anti-corrosive and anti-skinning, our paint compositions are anti-settling. That is, the pigment remains dispersed in its vehicle.

It is, therefore, an object of this invention to provide an improved paint composition for metallic surfaces.

It is another object of this invention to provide an anti-corrosive structural paint composition which may be applied to damp surfaces.

It is a further object of this invention to provide a paint composition for metallic surfaces which is anti-corrosive, anti-skinning, and anti-settling.

Another object of this invention is to provide a process for the production of paint compositions for metallic surfaces.

Additional objects of this invention will become apparent as the description proceeds.

According to the present invention, an aliphatic mono-carboxylic acid salt of a diamine having the general formula R—NH(CH$_2$)$_x$—NH$_2$ wherein R is an aliphatic hydrocarbon radical having from 8 to 22 carbon atoms and x is an integer of from 2 to 10, is incorporated into a paint composition to give it anti-corrosive, anti-skinning and anti-settling properties. The quantity of the salt used is in the range of ¼ to 2½ weight percent based on the total pigment content, preferably from ½ to 1 weight percent. The salt can be either the mono- or the diacid salt, preferably the diacid salt, of a fatty acid having from 8 to 22 carbon atoms, such as caprylic, capric, lauric, myristic, palmitic, stearic, oleic, linoleic, linolenic, behenic, tallow fatty acids, soya fatty acids, coconut fatty acids, etc. Branched-chain fatty acids are also included. The preferred acid is oleic.

The aliphatic hydrocarbon radical in the diamine, as pointed out hereinabove, contains from 8 to 22 carbon atoms and includes such radicals as caprylic, capric, lauric, myristic, palmitic, stearic, oleic, linoleic, linolenic, behenic, mixtures of radicals as obtained from tallow, soybean, coconut and vegetable oils, and also branched-chain hydrocarbon radicals. The preferred diamine is N-tallow-trimethylene diamine.

The paints into which the diamine salts hereinbefore described are incorporated contain, generally, a pigment, a vehicle for the pigment, and a drier, and can be of the primer, enamel, glossy, semi-glossy or flat type. The pigments which can be employed include the inorganic and organic types, well known in the art, such as red lead, red iron oxide, white lead, zinc oxide, titanium dioxide, lithopone, carbon black, prussian blue, etc. For structural type paints the preferred pigments are red lead and red iron oxide. The vehicles which can be employed include the vegetable oils such as linseed, both boiled and raw, soybean, polyester type oils such as glycerine, erythritol or pentaerythritol esters of fatty acids or phthalic acid or their anhydrides. Preferred vehicles include linseed oil and phthalic anhydride-fatty acid ester meeting U. S. Government specification TTR 266 having 60% non volatiles and a viscosity in the range of T to X on the Gardner-Holdt scale. The driers which can be employed include the naphthenates, oxides, resinates, oleates and acetates of cobalt, manganese, lead and zinc. The preferred driers are the naphthenates of cobalt, manganese and lead.

If desired, but not necessarily, a pigment extender such as asbestine, talc, barytes, gypsum, clay or chalk can be employed. Also, a pigment suspending agent such as aluminum stearate can be employed if desired. While a pigment suspending agent will supplement the action of the diamine salts of this invention, it is not necessary for the purpose of obtaining an anti-settling composition.

Our paint compositions can be applied to any metal surface, but they are particularly adapted to be applied to ferrous metal surfaces.

The process for preparing these paint compositions involves dispersing the diamine salts as hereinabove described and in the quantities mentioned to the vehicle portion of the paint before mixing all of the components. According to a preferred embodiment a concentrated solution, about 25 weight percent of the diamine salt in an aliphatic or aromatic type solvent or mineral spirits is added to a quantity of the vehicle in an amount which will provide about ¼ to 2½ weight percent of diamine salt based on the total pigment content. The pigment is then mixed with this and the pigment ground in the usual manner on a roller mill or pebble mill. In this manner the pigment particles are uniformly coated with the diamine salt. After grinding an additional quantity of vehicle is added along with drier and thinner such as mineral spirits.

With some pigments grinding is not necessary and the diamine salt solution can be dispersed into the vehicle portion of a paint paste, before thinning.

This invention will be more readily understood by reference to the following example, but it is not intended that it shall limit its scope. All quantities are given in parts by weight.

EXAMPLE

One side of the rusty test panels was wire brushed; the other side was sanded, washed with solvent, and dried. The panels were then dipped into water so that the lower halves were wetted. The panels were than painted with both corrosion inhibiting paints and control paints containing no N-tallow-trimethylene diamine dioleate. These panels were scored and exposed to the weather for six months. The paints employed were prepared in the conventional manner unless otherwise indicated and had the following composition:

A. *Red lead-linseed oil, corrosion-inhibiting*

| | Parts by weight |
|---|---|
| Red lead | 150 |
| Aluminum stearate | 0.45 |
| Raw linseed oil | 23 |
| X viscosity linseed oil | 26 |
| Mineral spirits | 43 |
| 6% manganese [1] | 3.4 |
| 24% lead [2] | 2.1 |
| 25% N-tallow-trimethylene diamine dioleate in mineral spirits (1% based on weight of pigment) | 6.0 |

[1] 6% manganese as manganese naphthenate in organic solvent.
[2] 24% lead as lead naphthenate in organic solvent.

B. *Red lead-linseed oil, control*

| | Parts by weight |
|---|---|
| Red lead | 300 |
| Aluminum stearate | 0.9 |
| Raw linseed oil | 47 |
| X viscosity linseed oil | 52 |
| Mineral spirits | 87 |
| 6% manganese [1] | 6.8 |
| 24% lead [2] | 4.2 |

[1] 6% manganese as manganese naphthenate in organic solvent.
[2] 24% lead as lead naphthenate in organic solvent.

C. *Red lead-alkyd, corrosion-inhibiting*

| | Parts by weight |
|---|---|
| Red lead | 150 |
| Aluminum stearate | 0.45 |
| TTR 266 alkyd 3R 60% N. V. T–X vis. | 126 |
| Mineral spirits | 22 |
| 6% cobalt [3] | 1.2 |
| 25% N-tallow-trimethylene diamine dioleate in mineral spirits (1% based on pigment) | 6.0 |

[3] 6% cobalt as cobalt naphthenate in organic solvent.

D. *Red lead-alkyd, control*

| | Parts by weight |
|---|---|
| Red lead | 300 |
| Aluminum stearate | 0.9 |
| TTR 266 alkyd 3R 60% N. V. T–X vis. | 252 |
| Mineral spirits | 44 |
| 6% cobalt [3] | 2.4 |

[3] 6% cobalt as cobalt naphthenate in organic solvent.

E. *Red iron oxide-alkyd, corrosion-inhibiting*

| | Parts by weight |
|---|---|
| Red iron oxide | 40 |
| Asbestine 3X | 33 |
| TTR 266 alkyd 3R 60% N. V., T–X vis. | 35 |
| 25% N-tallow-trimethylene diamine dioleate in mineral spirits (1% based on pigment) | 3.0 |

The above components are roller milled and then added to the following:

| | Parts by weight |
|---|---|
| TTR 266 alkyd 3R 60% N. V., T–X vis. | 88 |
| Mineral spirits | 55 |
| 6% cobalt [3] | 0.45 |

[3] 6% cobalt as cobalt naphthenate in organic solvent.

F. *Red iron oxide-alkyd, control*

| | Parts by weight |
|---|---|
| Red iron oxide | 81 |
| Asbestine 3X | 66 |
| TTR 266 alkyd 3R 60% N. V., T–X vis. | 70 |

The above components are roller milled and then added to the following:

| | Parts by weight |
|---|---|
| TTR 266 alkyd 3R 60% N. V., T–X vis. | 176 |
| Mineral spirits | 110 |
| 6% cobalt [3] | 0.9 |

[3] 6% cobalt as cobalt naphthenate in organic solvent.

G. *Red iron oxide-linseed oil, corrosion-inhibiting*

| | Parts by weight |
|---|---|
| Red iron oxide | 40 |
| Asbestine 3X | 33 |
| Raw linseed oil | 25 |
| X viscosity linseed oil | 10 |
| 25% N-tallow-trimethylene diamine dioleate in mineral spirits (1% based on pigment) | 3.0 |

The above components are roller milled and then added to the following:

| | Parts by weight |
|---|---|
| Mineral spirits | 135 |
| Raw linseed oil | 35 |
| X viscosity linseed oil | 26 |
| 6% manganese [1] | 0.8 |
| 24% lead [2] | 0.45 |

[1] 6% manganese as manganese naphthenate in organic solvent.
[2] 24% lead as lead naphthenate in organic solvent.

H. *Red iron oxide—linseed oil, control*

| | Parts by weight |
|---|---|
| Red iron oxide | 81 |
| Asbestine 3X | 66 |
| Raw linseed oil | 50 |
| X viscosity linseed oil | 20 |

The above components are roller milled and then added to the following:

| | Parts by weight |
|---|---|
| Mineral spirits | 270 |
| Raw linseed oil | 70 |
| X viscosity linseed oil | 52 |
| 6% manganese [1] | 1.6 |
| 24% lead [2] | 0.9 |

[1] 6% manganese as manganese naphthenate in organic solvent.
[2] 24% lead as lead naphthenate in organic solvent.

It was found at the end of the test period that the panels coated with the paints containing N-tallow-trimethylene diamine dioleate exhibited little or no corrosion, pitting or undercutting. Rusting of control panels was far advanced.

While this invention has been described and exemplified in terms of its preferred modifications, those skilled in the art will appreciate that many changes can be made without departing from the spirit of the invention.

We claim:
1. A paint composition for metal surfaces having incorporated therein from ¼ to 2½ weight percent, based upon the amount of pigment, of a salt of a fatty acid having from 8 to 22 carbon atoms and a diamine having the general formula:

$$R-NH-(CH_2)_x-NH_2$$

wherein R is an aliphatic hydrocarbon radical having from 8 to 22 carbon atoms and $x$ is an integer of from 2 to 10.

2. A paint composition for metal surfaces having incorporated therein from ¼ to 2½ weight percent, based upon the amount of pigment, of a fatty acid having from 8 to 22 carbon atoms and N-tallow-trimethylene diamine.

3. A paint composition for metal surfaces having incorporated therein from ¼ to 2½ weight percent, based upon the amount of pigment, of a salts of a fatty acid having from 8 to 22 carbon atoms and N-soya-trimethylene diamine.

4. A paint composition for metal surfaces having incorporated therein from ¼ to 2½ weight percent, based upon the amount of pigment, of the salt of a fatty acid containing 8 to 22 carbon atoms and an N-aliphatic-trimethylene diamine of the formula $$R-NHCH_2CH_2CH_2NH_2$$

wherein R is an aliphatic hydrocarbon radical having from 8 to 22 carbon atoms.

5. A paint composition for metal surfaces having incorporated therein from ¼ to 2½ weight percent, based upon the amount of pigment, of the salt of oleic acid and an N-aliphatic-trimethylene diamine of the formula $R-NHCH_2CH_2CH_2NH_2$ wherein R is an aliphatic hydrocarbon radical having from 8 to 22 carbon atoms.

6. A paint composition for metal surfaces having incorporated therein from ½ to 1 weight percent, based upon the amount of pigment, of N-tallow-trimethylene diamine dioleate.

References Cited in the file of this patent

UNITED STATES PATENTS

| | | |
|---|---|---|
| 2,400,785 | Rust | May 21, 1946 |
| 2,550,682 | Falkenburg et al. | May 1, 1951 |
| 2,591,904 | Zola | Apr. 8, 1952 |

OTHER REFERENCES

Mattiello: Protective and Decorative Coatings, vol. III, 1943, pages 727, 749 and 751.